March 14, 1961 — P. A. BUCK ET AL — 2,974,614
HOPPER AND CONTROL DISCHARGE
Filed May 7, 1959 — 3 Sheets-Sheet 1

INVENTORS
PORTER A. BUCK &
RICHARD G. CRIST
BY
ATTORNEY

March 14, 1961
P. A. BUCK ET AL
2,974,614
HOPPER AND CONTROL DISCHARGE
Filed May 7, 1959
3 Sheets-Sheet 2
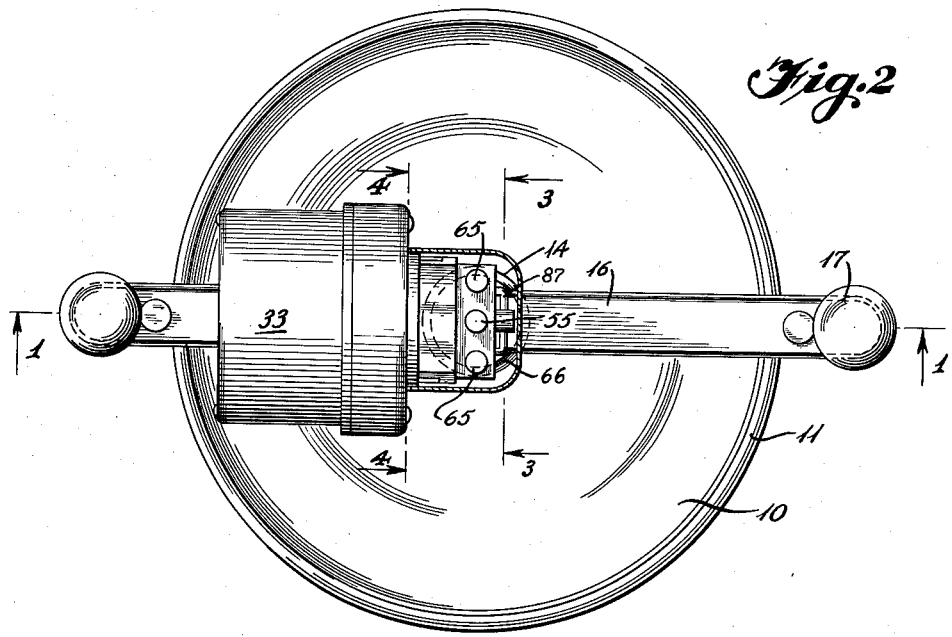
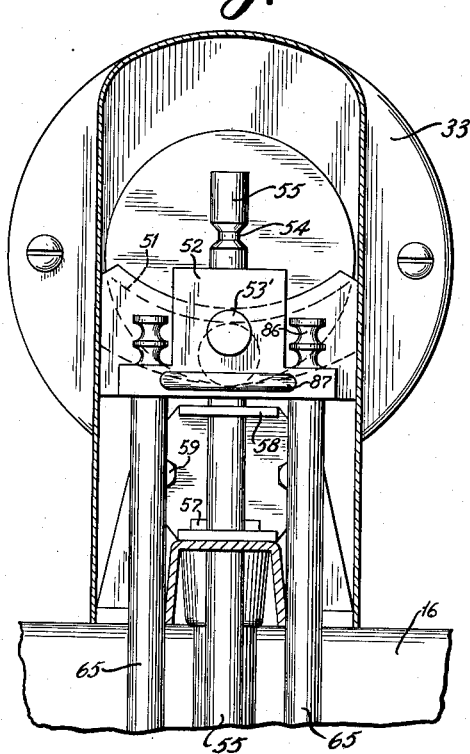
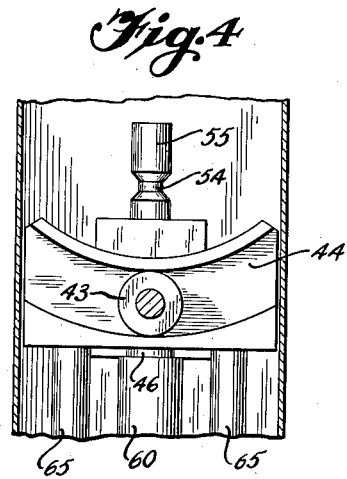
INVENTORS
PORTER A. BUCK &
RICHARD G. CRIST
BY
ATTORNEY

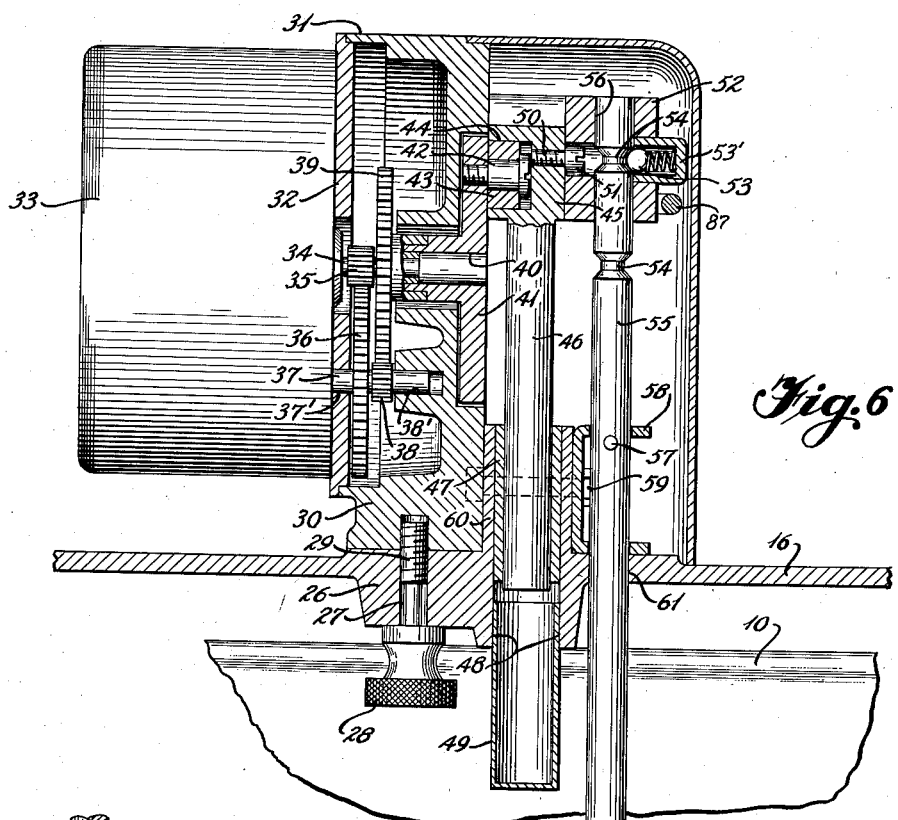

2,974,614
HOPPER AND CONTROL DISCHARGE

Porter A. Buck, Rte. 1, Box 394, Maitland, Fla., and Richard G. Crist, 815 Madison Blvd., Orlando, Fla.

Filed May 7, 1959, Ser. No. 811,595

8 Claims. (Cl. 107—14)

This invention relates to the supplying of metered amounts of materials from definite sources, to the treatment of such materials, and to the equipment employed in connection with the supplying and the treatment of such material.

The invention relates particularly to the feeding or discharge of a predetermined quantity of batter or other substance to be treated from the discharge spout of a hopper or other device from which a ring of dough or other substance is dropped into a pan or other receptacle where it is subjected to temperature modification such as cooking to produce a doughnut or other product.

Hoppers or containers and equipment of various kinds for producing and controlling the discharge therefrom have been produced and employed in the production of commodities of many kinds including doughnuts and the like but such devices have been complicated, expensive, cumbersome, awkward to handle, easy to get out of order and difficult to clean and keep sanitary.

It is an object of the invention to overcome the difficulties enumerated and to provide a hopper or container for batter or other substance, and discharge mechanism constructed to be operated either manually or mechanically and which are of few simple, inexpensive, durable parts combined in a compact structure and which readily can be taken apart for cleaning and can be reassembled in a minimum of time and with a minimum of effort.

Figure 1:
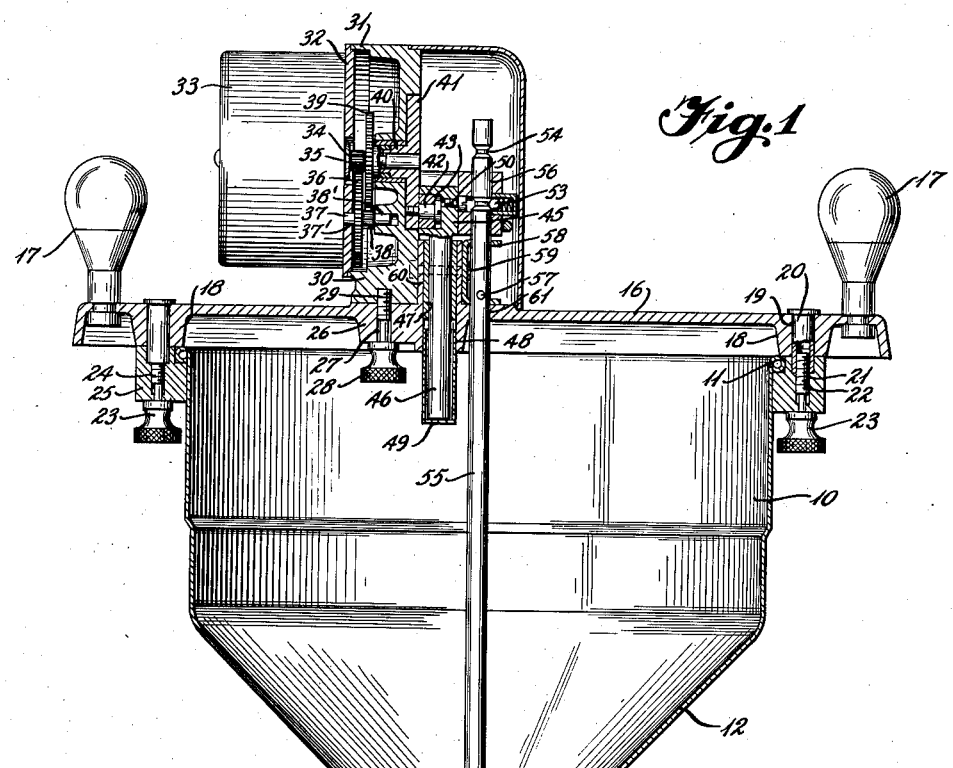

Other objects and advantages of the invention will be apparent from the following description taken in conjunction with the accompanying drawings wherein:

Fig. 1 is a central vertical section on the line 1—1 of Fig. 2;

Fig. 2, a top plan view;

Fig. 3, a section on the line 3—3 of Fig. 2;

Fig. 4, a section on the line 4—4 of Fig. 2; and

Figure 5:
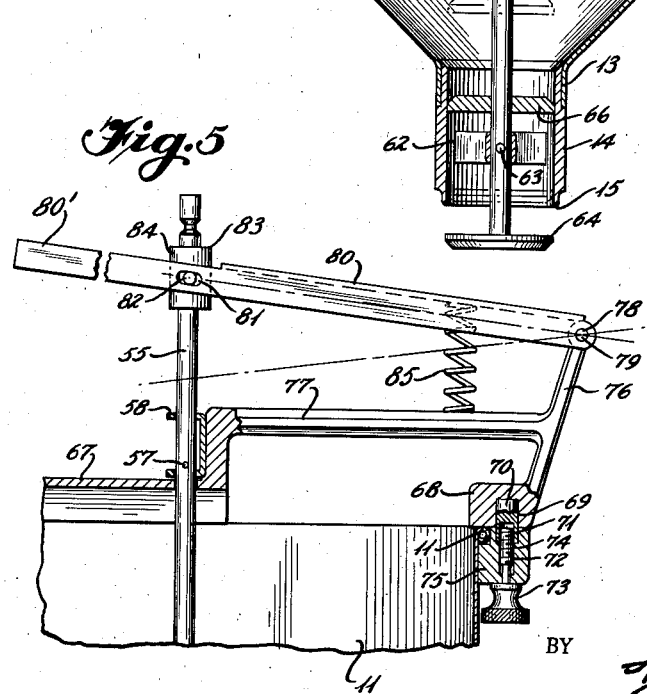
Figure 6:
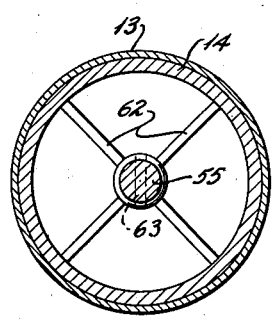

Fig. 5, a modified form of the invention;

Fig. 6, an enlarged fragmentary detail similar to Figure 1 illustrating the device in the starting position;

Fig. 7, a sectional view taken on line 7—7 of Fig. 6; and

Fig. 8, a section on the line 8—8 of Figure 6.

Briefly stated, the invention is a hopper with a conical lower portion terminating in a cylindrical discharge spout, and mechanism for producing and for controlling the discharge from such spout including a pair of spaced disks operable in conjunction with the spout, one of such disks serving as a piston or plunger to discharge or expel batter or other material through the spout, such batter being adapted to flow into the spout by gravity and the other disk serving as a cutter for detaching batter from around the lower disk below the lower discharge end of the spout in the form of a ring. The cutter disk is mounted on a central rod or stem and the discharge or expelling disk is mounted on a pair of rods or stems one on each side of the central stem with such pair of stems attached to a header and by a pin to a yoke having a downwardly arched slot in which a crankpin is reciprocably received in such a manner that when it moves endwise along the slot it raises and lowers the disks, such crankpin being mounted eccentrically on a crank in the form of a wheel or disk driven through reduction gearing from a motor and with the stem or shaft of the cutter disk having a pin which engages the opposite legs of a U-shaped stop member which limits such stem in its vertical movement, such stem being attached by a connection including a spring pressed detent in spaced grooves along said stem so that when the disks are in their uppermost positions one will be within the hopper elevated from the discharge spout and one will be in a position closing the lower end of the spout so that batter may flow downwardly beneath the upper disk into the spout and onto the lower disk, and when the disks are moved downwardly the lower disk will move below the lower end of the hopper until it is stopped whereupon the upper disk will continue downwardly forcing the batter downwardly and expel the same through the spout around the lower disk and when the latter is raised a ring of dough around the lower disk will be detached and allowed to drop by gravity into a pan or receptacle beneath the same.

With continued reference to the drawings, a hopper 10 has its upper edge rolled over to provide a reinforcing rim 11 and has a tapered or substantially conical lower portion 12 terminating in a cylindrical discharge spout 13. The hopper may be of relatively thin lightweight material with a heavier reinforcing sleeve 14 fixed thereto and having a thin or reduced lower cutting edge 15. The hopper may be supported in any desired manner as, for example, about its reduced lower end.

Across the upper portion of the hopper is mounted a bar 16 with handles 17 by which it can be applied and removed. The bar is provided with thickened portions 18 having openings 19 in which are received plugs 20 with lower internally threaded ends 21 for engagement by threads 22 on knurled headed screws 23, such screws extending through openings 24 in fastening lugs 25 so that by clamping the lugs 25 against the underside of the head or rim 11 of the hopper, the bar 16 is securely fastened to the hopper.

The bar 16 provides a support for a power unit such as, for example, an electric motor as shown in Figs. 1 and 2, or a hand-operated unit as illustrated in Fig. 5. The bar 16 is provided with an additional thickened portion 26 having an opening 27 in which is received a knurled screw 28, the reduced threaded end 29 of which threadedly engages a motor mounting 30 having an annular flange 31 receiving a cover plate 32.

A motor 33 is attached to the cover plate and motor mounting, the motor having a shaft 34 on which is fixed a relatively small gear 35 which meshes with or engages a larger gear 36 on a shaft 37 carried in openings 37' and 38' in the motor mount and on which same shaft a small gear 38 is attached and which drives a larger gear 39 mounted upon the hub 40 of a disk 41 into which a crank pin 42 is threaded, such crank pin receiving thereon a bearing ring 43 which is reciprocably mounted in a downwardly arched slot 44 in a yoke 45 so that said yoke may be raised and lowered by said crank pin and such yoke being provided with a depending guide stem 46 within a bearing sleeve 47, the bar 16 being provided with an opening 48 for such sleeve and the depending stem, a housing 49 for the lower end of said sleeve being located in said opening about said stem, thus preventing any leakage of oil from the motor through the bar into the hopper.

A drive member in the form of screw 50 is threaded into the yoke 45 and the head of said screw fits loosely in a transverse opening 51 in a header 52, the header having a spring-pressed detent 53 within a cap 53' press fitted into the header and adapted to engage the lower of a pair of annular grooves 54 in a stem 55 located in a vertical opening 56 in the header 52. This provides in effect a lost motion connection or snap over between the header and the stem, the vertical movement of the stem 55 being limited by a pin 57 reciprocable between the legs of a U-shaped stop member 58 secured to the motor mount 30 by means of bolts 59 extending through an upstanding sleeve portion 60 of the bar 16.

The stem or rod 55 extends through an opening 61 in the bar 16 and through a spider 62 in the lower spout end of the hopper being attached to said spider by a pin 63. Thus with the endwise movement of the stem 55 the spider maintains the stem centrally of the spout.

On the lower end of the stem 55 is a cutter disk 64 of an external diameter to slidably move within the lower end of the spout and detach batter or dough expelled through the lower end of the spout, the purposes of the disk 64 being to close the bottom of the hopper to permit the batter to flow downwardly into the spout and then to form and detach a ring.

On opposite sides of the stem 55 are rigid means in the form of a pair of rods or stems 65 having their upper ends fixed in the header 52 and with their lower ends connected to the disk 66 which forms an expelling plunger or piston which when it moves downwardly forces batter or dough beneath it from the spout. The stem 55 is adapted to be connected and held in one of two positions in the header 52 by means of the spring-pressed detent 53.

In the usual starting position the cutter 64 and the plunger or piston 66 are in their elevated positions. The cutter and plunger move downwardly together until the cutter stem is stopped by the pin 57 engaging the lower leg of the U-shaped stop member 58. Thereafter the side rods or stems and the plunger 66 continue downward to expel material from the spout. The rotation of the crank within the yoke produces this downward movement and further rotation causes continued downward movement of the plunger and causes the spring loaded ball or detent to move out of the upper groove in the center cutter stem or shaft and to ride down the shaft until the yoke reaches its lowermost position at which time the spring-pressed ball or detent engages the lower of the two grooves of the cutter shaft. On the down stroke the column of dough is adapted to be removed from the spout of the hopper and is extruded or squeezed out by the continued movement of the upper disk. In the latter return portion of the stroke both disks are moved upwardly together until the pin in the cutter shaft strikes the upper leg of the U-shaped member, after which continued rotation of the crank will cause the spring-loaded ball or detent to ride out of the lower groove of the center shaft up the shaft and into the upper groove at the completion of the stroke, the lower or cutter disk traveling about one-half the distance of the upper or extruding disk. The fact that the lower extremity of the spout is reduced in thickness facilitates the detachment of the dough from the column and allows it to drop by gravity into a cooking vessel or the like (not shown).

In Fig. 5 there is disclosed a structure for manual operation. In this a hopper 10 has a cross-bar 67 provided with thickened portions 68 having openings 69 in which are fitted plugs 70 having internally threaded bores 71 for engagement by threads 72 of knurled headscrews 73 which extend through openings 74 in fastening lugs 75 so that by clamping the lugs against the underside of the bead or rim 11 of the hopper, the bar 67 is securely fastened to the hopper.

The bar 67 is provided with an upstanding arm 76 connected by brace 77 and such bar has a pivot eye 78 in which is disposed a pivot 79 on which one end of an operating lever 80 having a gripping or manipulating portion 80' is pivoted. The opposite end of the lever has a bifurcated end with a drive member in the form of yokes 81 which engage oppositely disposed studs or pins 82 carried in the header 84 to which the rods 55 and 65 are attached. A stop member 58 and pin 57 are employed and the operation is the same as in the previously described embodiment. A spring 85 is confined between the brace 77 and the operating lever 80 and serves to press the lever toward its elevated position.

In both forms of the invention, means are provided to vary the thickness of the batter slug fed through the spout. This is accomplished by providing each of the upper ends of the rods 65 with spaced circular grooved portions as indicated at 86 in Fig. 3 and providing a U-shaped key 87 whose legs pass through apertures in the header and into a pair of recesses 86 in the rods 65. The key 87 may be held tight in the header by any conventional means, as by screws, not shown.

It will be obvious to one skilled in the art that various changes may be made in the invention without departing from the spirit and scope thereof and therefore the invention is not limited by that which is illustrated in the drawings and described in the specification but only as indicated in the accompanying claims.

What is claimed is:

1. In a doughnut making machine, a hopper having a discharge spout, a cutter movable in and to a position beyond the spout, a plunger movable in and to a position within the hopper and out of the spout, a stem supporting the cutter, stop means for limiting the motion of the stem and cutter in each direction, means to reciprocate the stem, said means including a drive member, a header driven thereby through a fixed distance in each direction greater than the displacement of the stem, as limited by the stop member, releasable drive connections between the header and the stem comprising a pair of spaced connections on one and a resilient connection engaging means in the other, and rigid means interconnecting the header and the plunger.

2. In a doughnut making machine, a hopper having a discharge spout, a cutter movable in and to a position beyond the spout, a plunger movable in and to a position within the hopper and out of the spout, a stem supporting the cutter, stop means for limiting the motion of the stem and cutter in each direction, means to reciprocate the stem, said means including a drive member, a header driven thereby through a fixed distance in each direction greater than the displacement of the stem, as limited by the stop member, spaced recesses along the length of the stem, a resilient detent in the header interchangeably engageable with the spaced recesses in the stem, and rigid means interconnecting the header and the plunger.

3. In a doughnut making machine a hopper having a spout, a cutter reciprocable toward and away from the mouth of the spout to cut off dough issuing from the mouth of the spout, a stem connected with the cutter, a plunger within the hopper movable into the spout to force dough out through the spout, stop means limiting the extent of movement of the stem and cutter, reciprocable drive means including a header, said header having snap over connections with said stem at two locations thereof displaced longitudinally of the stem, said header having a displacement in each direction greater than the movement of the stem as limited by the stop member, and rigid connections between the header and the plunger.

4. In a doughnut making machine, a hopper having a spout, a cutter reciprocable toward and away from the mouth of the spout to cut off dough issuing from the mouth of the spout, a stem connected with the cutter, a plunger within the hopper movable into the spout to force dough out through the mouth of the spout, a stop member limiting, in each direction of movement, the extent of movement of the stem and cutter, a reciprocable header having a motion in each direction greater than the permissible movement of the stem and cutter as limited by the stop member, a snap over drive connection between the header and stem to engage the stem and header with each other at two locations spaced from each other longitudinally of the stem, rigid drive connections between the header and plunger and means to drive the header.

5. In a doughnut making machine, a hopper having a spout, a cutter reciprocable toward and away from the mouth of the spout to cut off dough issuing from the mouth of the spout, a stem connected with the cutter, a plunger within the hopper movable into the spout to force dough out through the mouth of the spout, a stop member limiting, in each direction of movement, the extent of movement of the stem and cutter, a reciprocable header having a motion in each direction greater than the permissible movement of the stem and cutter as limited by the stop member, a snap over drive connection between the header and stem to engage the stem and header with each other at two locations spaced from each other longitudinally of the stem, rigid drive connections between the header and plunger and means to drive the header, said drive means comprising a slotted yoke having a pin engaged with the header, a crank pin engaging the slot within the yoke and a motor driving the crank pin.

6. In a doughnut making machine, a hopper having a spout, a cutter reciprocable toward and away from the mouth of the spout to cut off dough issuing from the mouth of the spout, a stem connected with the cutter, a plunger within the hopper movable into the spout to force dough out through the mouth of the spout, a stop member limiting, in each direction of movement, the extent of movement of the stem and cutter, a reciprocable header having a motion in each direction greater than the permissible movement of the stem and cutter as limited by the stop member, a snap over drive connection between the header and stem to engage the stem and header with each other at two locations spaced from each other longitudinally of the stem, rigid drive connections between the header and plunger and means to drive the header, said drive means comprising a slotted yoke having a pin engaged with the header, a crank pin engaging the slot within the yoke, the crank pin being mounted eccentrically on a disk, a motor, and reduction gearing between the motor and the disk.

7. In a doughnut making machine, a hopper having a spout, a cutter reciprocable toward and away from the mouth of the spout to cut off dough issuing from the mouth of the spout, a stem connected with the cutter, a plunger within the hopper movable into the spout to force dough out through the mouth of the spout, a stop member limiting, in each direction of movement, the extent of movement of the stem and cutter, a reciprocable header having a motion in each direction greater than the permissible movement of the stem and cutter as limited by the stop member, a snap over drive connection between the header and stem to engage the stem and header with each other at two locations spaced from each other longitudinally of the stem, rigid drive connections between the header and plunger and means to drive the header, said drive means comprising a hand lever pivoted to a part fixed with relation to the hopper, and a pin and slot connection between the hand lever and the header.

8. In a doughnut making machine a hopper having a spout, a cutter reciprocable toward and away from the mouth of the spout to cut off dough issuing from the mouth of the spout, a stem connected with the cutter, a plunger within the hopper movable into the spout to force dough out through the spout, stop means limiting the extent of movement of the stem and cutter, reciprocable drive means including a header, said header having snap over connections with said stem at two locations thereof displaced longitudinally of the stem, said header having a displacement in each direction greater than the movement of the stem as limited by the stop member, and adjustable connections between the header and the plunger comprising at least one rigid rod connected to the plunger and having an upper end with spaced grooves therearound, and a member passed through the header and engaging one of the grooves.

References Cited in the file of this patent
UNITED STATES PATENTS

| | | |
|---|---|---|
| 1,833,933 | Carpenter | Dec. 1, 1931 |
| 1,847,293 | Carpenter | Mar. 1, 1932 |
| 2,610,590 | Van Campen | Sept. 16, 1952 |
| 2,669,949 | Cottingham | Feb. 23, 1954 |
| 2,881,716 | Belshaw | Apr. 14, 1959 |